United States Patent
Lee et al.

(10) Patent No.: US 9,838,994 B1
(45) Date of Patent: Dec. 5, 2017

(54) PRODUCTION SYSTEM AND METHOD FOR LOCATION-AWARE ENVIRONMENT

(71) Applicant: GEMTEK TECHNOLOGY CO., LTD., Hsinchu County (TW)

(72) Inventors: Kuo-Tsai Lee, Hsinchu (TW); Cory Koon-Sing Lam, Hsinchu (TW); Ling-Chun Chen, Hsinchu (TW); Chih-Cheng Chang, Hsinchu (TW); Yu-Tse Tseng, Hsinchu (TW)

(73) Assignee: GEMTEK TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 15/259,055

(22) Filed: Sep. 8, 2016

(30) Foreign Application Priority Data

May 19, 2016 (TW) .............................. 105115576 A

(51) Int. Cl.
*H04W 64/00* (2009.01)
*H04B 17/318* (2015.01)

(52) U.S. Cl.
CPC .......... *H04W 64/00* (2013.01); *H04B 17/318* (2015.01)

(58) Field of Classification Search
CPC ................................................... H04W 64/00
See application file for complete search history.

(56) References Cited

U.S. PATENT DOCUMENTS

| | | | |
|---|---|---|---|
| 6,269,246 B1 | 7/2001 | Rao et al. | |
| 2005/0037775 A1 | 2/2005 | Moeglein et al. | |
| 2006/0089153 A1 | 4/2006 | Sheynblat | |
| 2011/0064000 A1 | 3/2011 | Kim et al. | |
| 2016/0143065 A1* | 5/2016 | Gupta | H04W 64/003 455/404.2 |

FOREIGN PATENT DOCUMENTS

| | | |
|---|---|---|
| CN | 102905368 A | 1/2013 |
| CN | 105223547 A | 1/2016 |
| TW | 201225711 A | 6/2012 |
| TW | 201344230 A | 11/2013 |

\* cited by examiner

*Primary Examiner* — Daniel Lai
*Assistant Examiner* — Frank Donado
(74) *Attorney, Agent, or Firm* — CKC & Partners Co., Ltd.

(57) ABSTRACT

The present invention discloses a production system and method for location-aware environment. The method comprises the following steps: making each of the gateways sense a test RSSI corresponded to a test position of the end device; obtaining a corresponded reference GPS parameter through finding corresponding data of the fingerprint positioning database according to the test RSSI; and determining the selected area is a location-aware completed area if a difference between the reference GPS parameter and the real GPS parameter is smaller than or equal to a preset error.

10 Claims, 2 Drawing Sheets

PRODUCTION SYSTEM AND METHOD FOR LOCATION-AWARE ENVIRONMENT

RELATED APPLICATIONS

This application claims priority to Taiwan Application Serial Number 105115576, filed May 19, 2016, which is herein incorporated by reference.

BACKGROUND

Field of Invention

The present invention relates to a production system and method for location-aware environment.

Description of Related Art

In conventional technology, the traditional Global Positioning System uses a plurality of satellites to transmit signals to the ground, and these signals are used to position the locations of users. The Global Positioning System is applied for navigation of vehicles or mobile phones. However, the Global Positioning System needs longer process time, and shelters affect the accuracy of the Global Positioning System easily. In addition, for small range position mechanism, the existing fingerprint positioning method needs that the end device initiatively returns the accessible station data, so as to generate additional load of the end device.

SUMMARY

The present invention provides a production system and method for location-aware environment. The production system builds fingerprint positioning database initiatively. In the process of building fingerprint positioning database, adding the amount of gateways improves the position accuracy. When the fingerprint positioning database with high accuracy is built completely, the selected area has a location-aware function and an end device doesn't need to embed any positioning modules. When the end device enters the selected area, gateways sense a received signal strength indicator (RSSI) of the end device. A host compares the data of the fingerprint positioning database and the sensed RSSI of the gateways to position the end device.

An aspect of the disclosure is to provide a production system for location-aware environment adapted for making a selected area have the location-aware function, which comprises an end device, a plurality of gateways, and a host. The end device has a GPS module, wherein the GPS module detects a GPS parameter of the end device. The plurality of gateways operating an exploration mode, wherein the exploration mode is defined that the plurality of gateways collects the GPS parameters corresponded to a plurality of specific positions of the end device respectively, the plurality of gateways also sense received signal strength indicators (RSSI) corresponded to the plurality of specific positions of the end device respectively. The host connects to the plurality of gateways respectively, wherein the host builds a fingerprint positioning database according to the GPS parameters corresponded to the specific positions of the end device and the RSSI corresponded to the specific positions of the end device respectively, the host is operated at a test mode when a collection level of the fingerprint positioning database is achieved to a preset condition, the host makes each of the gateways sense a test RSSI corresponded to a test position of the end device in the test mode the host obtains a corresponded reference OPS parameter through finding corresponding data of the fingerprint positioning database according to the test RSSI, the host compares the reference GPS parameter with a real GPS parameter corresponded to the test position of the end device, the host determines the selected area is a location-aware completed area if a difference between the reference GPS parameter and the real GPS parameter is smaller than or equal to a preset error.

In one embodiment of the present invention, the host determines that the selected area is needed to add an amount of the gateways, ends the test mode, and operates exploration mode again if the difference between the reference GPS parameter and the real GPS parameter is greater than the preset error. The host makes the plurality of gateways collect the GPS parameters corresponded to a plurality of other specific positions of the end device respectively. The plurality of gateways also sense RSSI corresponded to the other specific positions of the end device respectively in order to accumulate data amount of the fingerprint positioning database.

In one embodiment of the present invention, the host operates the exploration mode through the plurality of gateways after adding the amount of gateways. The host operates the test mode again after the collection level of the fingerprint positioning database is achieved to the preset condition. In the test mode, the host determines that the selected area is the location-aware completed area if the difference between the reference GPS parameter and the real GPS parameter is smaller than or equal to a preset error. After determining the selected area is the location-aware completed area the host does not operate the exploration mode repeatedly.

In one embodiment of the present invention, each of the gateways has a Radio Frequency (RF) antenna respectively; the RF antenna corresponded to each of the gateways senses a beacon transmitted by the end device respectively. Each of the gateways calculates the RSSI corresponded to the beacon respectively. The host captures the RSSI calculated by the gateways and the GPS parameter corresponded to the end device's position, wherein the GPS parameter is received by the gateway and transmitted by the end device.

In one embodiment of the present invention, the host sorts the gateways according to value of the RSSI between the gateways and the end device at each specific position to generate a specific positioning fingerprint in order to build the fingerprint positioning database, and each of the specific positioning fingerprints is corresponded to one of the reference GPS parameters respectively in the fingerprint positioning database.

An aspect of the disclosure is to provide a production method for location-aware environment adapted for making a selected area have the location-aware function, and the method comprises the following steps: operating an exploration mode through a plurality of gateways, wherein the exploration mode is defined that the plurality of gateways collects the GPS parameters corresponded to a plurality of specific positions of an end device respectively, the plurality of gateways also sense RSSI corresponded to the plurality of specific positions of the end device respectively; building a fingerprint positioning database according to the GPS parameters corresponded to the specific positions of the end device and the RSSI corresponded to the specific positions of the end device respectively; operating at a test mode when a collection level of the fingerprint positioning database is achieved to a preset condition making each of the gateways sense a test RSSI corresponded to a test position of the end device in the test mode; obtaining a corresponded reference GPS parameter through finding corresponding data of the fingerprint positioning database according to the test RSSI; comparing the reference GPS parameter with a real GPS parameter corresponded to the test position of the end device; and determining the selected area is a location-aware completed area if a difference between the reference GPS parameter and the real GPS parameter is smaller than or equal to a preset error.

In one embodiment of the present invention, the method further comprises the following step; determining that the selected area is needed to add an amount of the gateways, ending the test mode, and operating exploration mode again if the difference between the reference GPS parameter and the real GPS parameter is greater than the preset error; and making the plurality of gateways collect the GPS parameters corresponded to a plurality of other specific positions of the end device respectively, the plurality of gateways also sense RSSI corresponded to the other specific positions of the end device respectively in order to accumulate data amount of the fingerprint positioning database.

In one embodiment of the present invention, the method further comprises the following step: operating the exploration mode through the plurality of gateways after adding the amount of gateways, the host operates the test mode again after the collection level of the fingerprint positioning database is achieved to the preset condition and determining that the selected area is the location-aware completed, area if the difference between the reference GPS parameter and the real OPS parameter is smaller than or equal to a preset error in the test mode, after determining the selected area is the location-aware completed area, not operating the exploration mode repeatedly.

In one embodiment of the present invention, wherein the steps of collecting the GPS parameters corresponded to a plurality of specific positions of an end device respectively and sensing RSSI corresponded to the plurality of specific positions of the end device respectively, comprising: sensing a beacon transmitted by the end device respectively through RF antennae, wherein each of the gateways has one RF antenna respectively; calculating the RSSI corresponded to the beacon respectively through each of the gateways; and capturing the RSSI calculated by the gateway and the GPS parameter corresponded to the end device's position, wherein the GPS parameter received by the gateway and transmitted by the end device.

In one embodiment of the present invention, wherein the steps of building a fingerprint positioning database according to the GPS parameters corresponded to the specific positions of the end device and the RSSI corresponded to the specific positions of the end device respectively, comprising: sorting the gateways according to value of the RSSI between the gateways and the end device at each specific position to generate a specific positioning fingerprint in order to build the fingerprint positioning database, each of the specific positioning fingerprints is corresponded to one of the reference GPS parameters respectively in the fingerprint positioning database.

It is to be understood that both the foregoing general description and the following detailed description are by examples, and are intended to provide further explanation of the invention as claimed.

BRIEF DESCRIPTION OF THE DRAWINGS

The invention can be more, fully understood by reading the following detailed description of the embodiment, with reference made to the accompanying drawings as follows.

DETAILED DESCRIPTION

Figure 1:
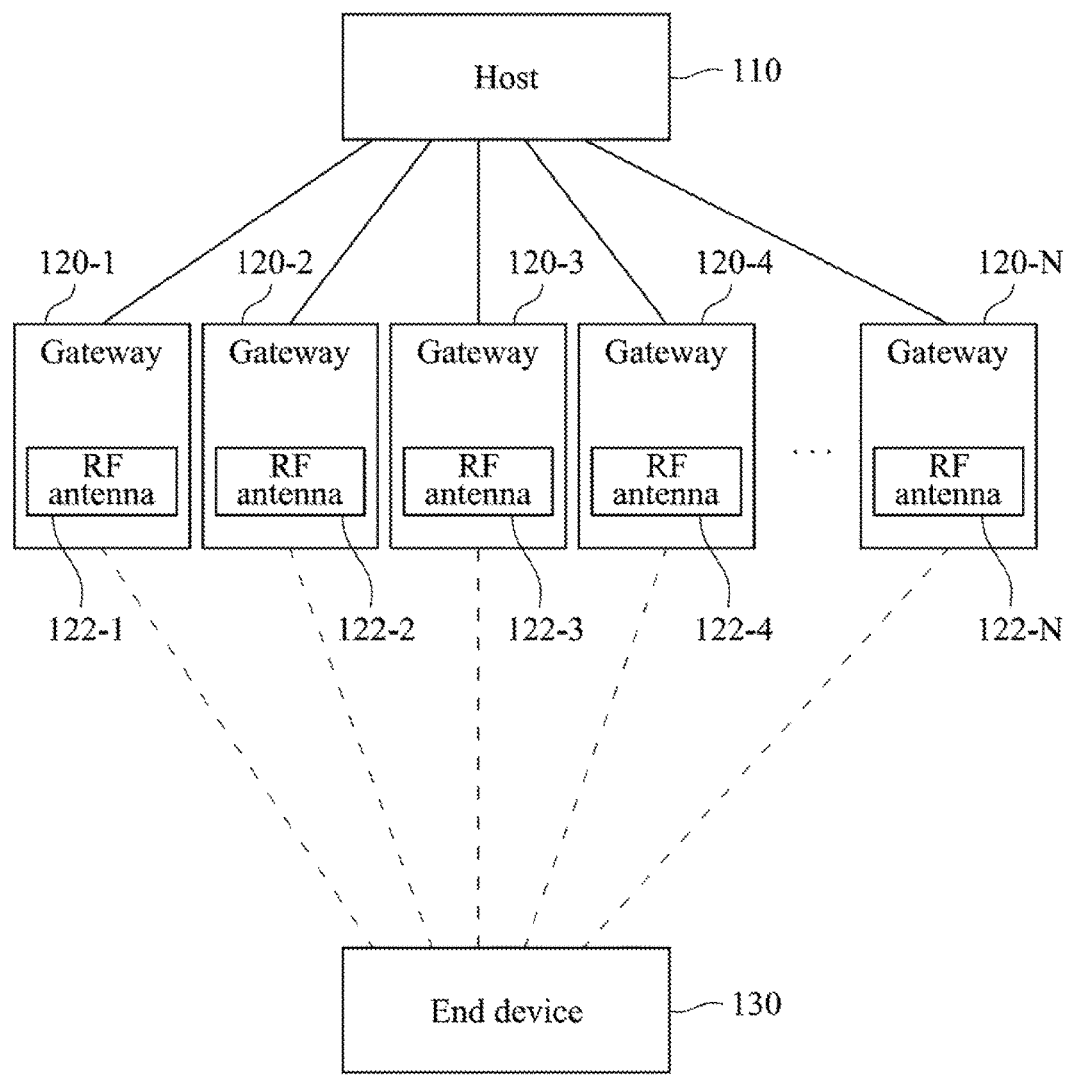
FIG. 1 is a block diagram of the production system for location-aware environment according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of the production system for location-aware environment according to the first embodiment of the present invention. The production system for location-aware environment is adapted for making a selected area have the location-aware function. The production system for location-aware environment comprises a host 110, a plurality of gateways 120-1~120-N, and an end device 130, wherein N is the amount of gateways, and N is a positive integer. The host 110 connects to the plurality of gateways 120-1~120-N respectively. The host 110 is a personal computer with a processor or a big computer system Each of the gateways 120-1~120-N has one RF antenna 122-1~122-N respectively. The RF antennae 122-1~122-N are used to sense beacons transmitted by the end device 130. The end device 130 embeds a global positioning module, and the global positioning module detects a GPS parameter of the end device 130.

Figure 2:
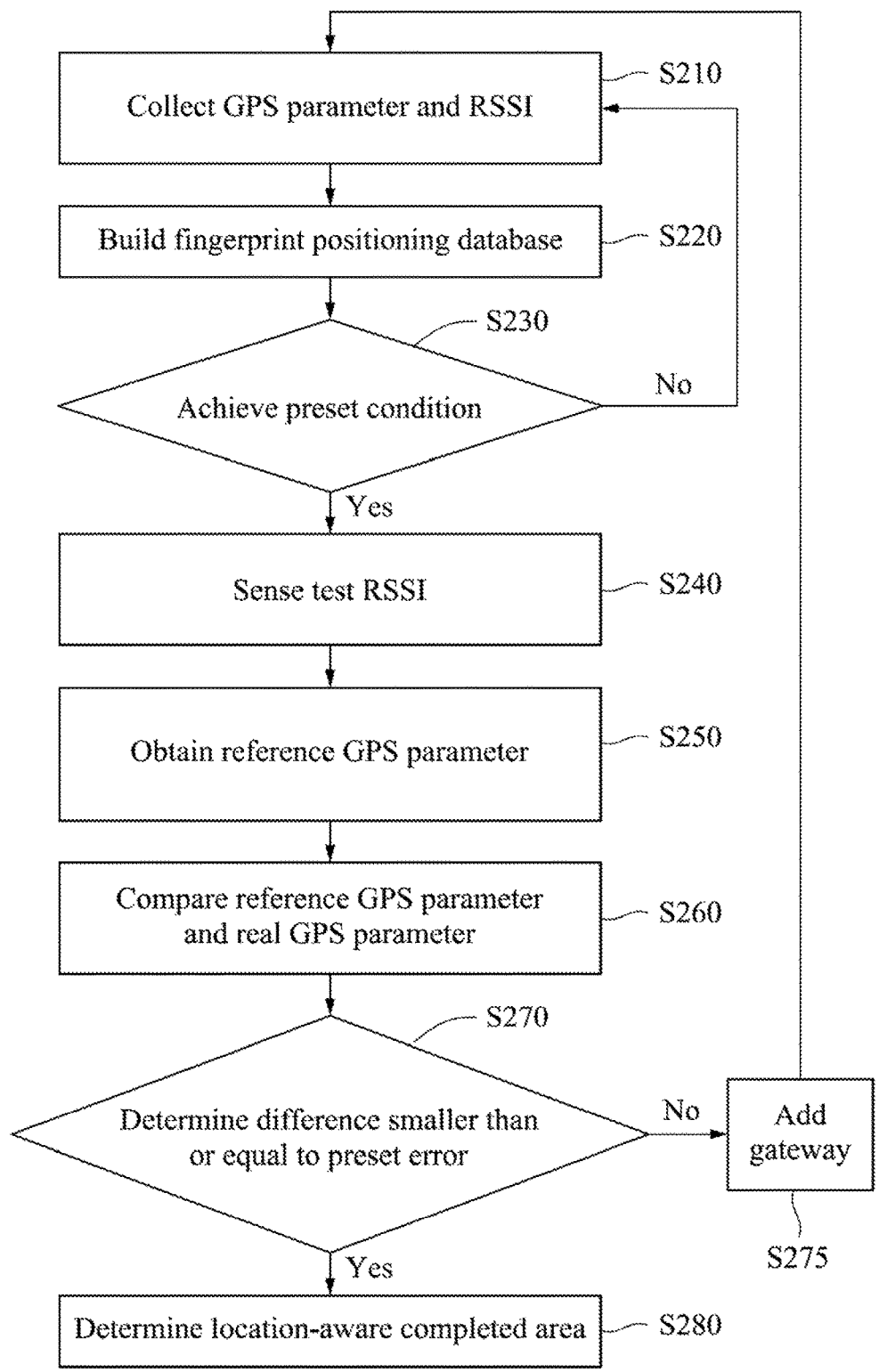
FIG. 2 is a flowchart of the production method for location-aware environment according to the first embodiment of the present invention.

FIG. 2 is a flowchart of the production method for location-aware environment according to the first embodiment of the present invention. Referring to FIG. 1 and FIG. 2, the production system for location-aware environment of the present invention operates an exploration mode. The exploration mode is defined that the plurality of gateways 120-1~120-N collects the GPS parameters corresponded to a plurality of specific positions of the end device 130 respectively, the plurality of gateways also sense received signal strength indicators (RSSI) corresponded to the plurality of specific positions of the end device 130 respectively (Step S210). The details of Step S210 are defined as follows. The RF antennae 122-1~122-N corresponded to each of the gateways 120-1~120-N sense a beacon transmitted by the end device 130 respectively, each of the gateways 120-1~120-N calculates the RSSI corresponded to the beacon respectively, the host 110 captures the RSSI calculated by the gateways 120-1~120-N and the GPS parameter corresponded to the end device's position, wherein the GPS parameter is received by the gateways 120-1~120-N and transmitted by the end device 130.

The host 110 builds a fingerprint positioning database according to the GPS parameters corresponded to the specific positions of the end device 130 and the RSSI corresponded to the specific positions of the end device 130 respectively (Step S220). The details of Step S220 are defined as follows. The host 110 sorts the gateways 120-1~120-N according to value of the RSSI between the gateways 120-1~120-N and the end device 130 at each specific position to generate a specific positioning fingerprint. For example, there are five gateways a, b, c, d, and e at the selected area. When the end device 130 is at position X, the value of RSSI between the end device 130 and the gateways a, b, c, d, and e, from large to small, the order is b, c, d, e, and a. Accordingly, in the fingerprint positioning database, the position X is corresponded to the specific positioning fingerprint bcdea. In addition, each of the specific positioning fingerprints is corresponded to one of the reference GPS parameters respectively in the fingerprint positioning database. The corresponded reference GPS parameters are the GPS parameters collected in Step S210. In the above embodiment, the corresponded reference GPS parameter is the GPS parameter of the position X. Namely, if the host 110 obtains the specific positioning fingerprint of the end device 130, the host 110 can find the current GPS parameter of the end device 130 according to the specific positioning fingerprint in the fingerprint positioning database.

Next, the host 110 determines that whether a collection level of the fingerprint positioning database is achieved to a preset condition (Step S230). The preset condition can be a specific amount of data. If the specific amount of data is not achieved, the production method of the present invention is returned to Step S210. The production system of the present invention collects the GPS parameters of the end device 130 at other positions continually and senses the corresponded RSSI. If the collection level of the fingerprint positioning database is achieved to the specific amount of data, the collection level is achieved to the preset condition, enter the test mode. The test mode is used for test if the selected area is a location-aware completed area or not. Namely, the test mode is used for test if the selected area becomes an environment with the location-aware function.

In the test mode, the host 110 makes each of the gateways 120-1~120-N sense a test RSSI corresponded to a test position of the end device 130 (Step S240). Namely, when the end device 130 is located at the test position, each of the gateways 120-1~120-1 senses the RSSI between themselves and the end device 130 respectively. Next, the host 110 obtains a corresponded reference GPS parameter through finding corresponding data of the fingerprint positioning database according to the test RSSI (Step S250).

Next, the host 110 compares the reference GPS parameter collected at Step S250 with a real GPS parameter corresponded to the test position of the end device 130 (Step S260). The real GPS parameter is generated by the GPS module of the end device 130, namely, the GPS module of the end device 130 positioned the end device 130. Next, the host 110 determines that if a difference between the reference GPS parameter and the real GPS parameter is smaller than or equal to a preset error (Step 270). If the determination of Step S270 is Yes, the data amount of the fingerprint positioning database is enough, so as to make the real GPS parameter be close to the reference GPS parameter. Therefore, the selected area is determined as a location-aware completed area (Step S280). Namely, the selected area an environment with location-aware function.

If the determination of step S270 is No, which represent the difference between the reference GPS parameter and the real GPS parameter is greater than the preset error. The host 110 determines that the selected area has to add the amount of gateways (Step S275). The host 110 has to end the test mode and operates the exploration mode again (Step S210). The plurality of gateways 120-1~120-N collect the GPS parameters corresponded to a plurality of other specific positions of the end device 130 respectively, the plurality of gateways 120-1~120-N also sense RSSI corresponded to the of other specific positions of the end device 130 respectively in order to accumulate data amount of the fingerprint positioning database. The host 110 sorts the gateways 120-1~120-N according to value of the RSSI between the gateways 120-1~120-N and the end device 130 at each specific position to generate a specific positioning fingerprint. For example, there are five gateways a, b, c, d, and e at the selected area. When the end device 130 is at position X, the value of RSSI between the end device 130 and the gateways a, b, d, and e, from large to small, the order is b, c, d, e, and a. Accordingly, in the fingerprint positioning database, the position X is corresponded to the specific positioning fingerprint bcdea. Another example, adding the amount of gateways, there are ten gateways a, b, c, d, e, f, g, h, i, j. When the end device 130 is at position X, the value of RSSI between the end device 130 and the gateways a, b, c, d, e, f, g, h, i, j, from large to small, the order is b, h, c, f, d, g, e, i, a, and j. Accordingly, in the fingerprint positioning database, the position X is corresponded to the specific positioning fingerprint bhcfdgeiaj. Namely, if the production system for location-aware environment of the present invention has five gateways, the specific positioning fingerprint has 5! (5!=120) kinds of variations. However, if the production system for location-aware environment of the present invention has ten gateways, the specific positioning fingerprint has 10! (10!=3628800) kinds of variations. Therefore, after adding the amount of gateways, the accuracy of distinguishing each position of the selected area will be improved.

After the production system of the present invention adds the amount of gateways, the host 110 operates the exploration mode again through the plurality of gateways 120-1~120-N. The host 110 operates the test mode again after the collection level of the fingerprint positioning database is achieved to the preset condition. In the test mode, the host 110 determines that the selected area is the location-aware completed area if the difference between the reference GPS parameter and the real GPS parameter is smaller than or equal to the preset error. After determining the selected area is the location-aware completed area, the host 110 does not operate the exploration mode repeatedly.

The present invention provides a production system and method for location-aware environment. The production system builds fingerprint positioning database initiatively. In the process of building fingerprint positioning database, adding the amount of gateways improves the position accuracy. When the fingerprint positioning database with high accuracy is built completely, the selected area has a location-aware function and an end device doesn't need to embed any positioning modules. When the end device enters the selected area, gateways sense a received signal strength indicator (RSSI) of the end device. A host compares the data of the fingerprint positioning database and the sensed RSSI of the gateways to position the end device. The traditional fingerprint position mechanism has to return the surrounding accessible station data. However, the location-aware environment produced by the production system of the present invention doesn't need to return the surrounding accessible station data, and the production system of the present invention can still has high position accuracy.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A production system for location-aware environment, adapted for making a selected area have the location-aware function, comprising:
an end device having a GPS module, wherein the GPS module detects a GPS parameter of the end device;
a plurality of gateways operating an exploration mode, wherein the exploration mode is defined that the plurality of gateways collects the GPS parameters corresponded to a plurality of specific positions of the end device respectively, the plurality of gateways also sense received signal strength indicators (RSSI) corresponded to the plurality of specific positions of the end device respectively; and
a host connecting to the plurality of gateways respectively, wherein the host builds a fingerprint positioning database according to the GPS parameters corresponded to the specific positions of the end device and the RSSI corresponded to the specific positions of the end device respectively,
a host connecting to the plurality of gateways respectively;
a fingerprint positioning database built by the host according to the GPS parameters corresponded to the specific positions of the end device and the RSSI corresponded to the specific positions of the end device respectively, wherein the host is configured to operate at a test mode when a collection level of the fingerprint positioning database is achieved to a preset condition, the gateways are configured to sense a test RSSI corresponded to a test position of the end device in the test mode, and the host is further configured to:
obtain a corresponded reference GPS parameter through finding corresponding data of the fingerprint positioning database according to the test RSSI, compare the reference GPS parameter with a real GPS parameter corresponded to the test position of the end device and determine the selected area is a location-aware completed area when a difference between the reference GPS parameter and the real GPS parameter is smaller than or equal to a preset error.

2. The production system for location-aware environment of claim 1, wherein the host determines that the selected area is needed to add an amount of the gateways, ends the test mode, and operates the exploration mode again if the difference between the reference GPS parameter and the real GPS parameter is greater than the preset error, the host makes the plurality of gateways collect the GPS parameters corresponded to a plurality of other specific positions of the end device respectively, the plurality of gateways also sense received signal strength indicators (RSSI) corresponded to the other specific positions of the end device respectively in order to accumulate data amount of the fingerprint positioning database.

3. The production system for location-aware environment of claim 2, wherein the host operates the exploration mode through the plurality of gateways after adding the amount of gateways, the host operates the test mode again after the collection level of the fingerprint positioning database is achieved to the preset condition, in the test mode, the host determines that the selected area is the location-aware completed area if the difference between the reference GPS parameter and the real GPS parameter is smaller than or equal to a preset error, after determining the selected area is the location-aware completed area, the host does not operate the exploration mode repeatedly.

4. The production system for location-aware environment of claim 1, wherein each of the gateways has a Radio Frequency (RF) antenna respectively, the RF antenna corresponded to each of the gateways senses a beacon transmitted by the end device respectively, each of the gateways calculates the RSSI corresponded to the beacon respectively, the host captures the RSSI calculated by the gateways and the GPS parameter corresponded to the end device's position, wherein the GPS parameter is received by the gateway and transmitted by the end device.

5. The production system for location-aware environment of claim 1, wherein the host sorts the gateways according to value of the RSSI between the gateways and the end device at each specific position to generate a specific positioning fingerprint in order to build the fingerprint positioning database, each of the specific positioning fingerprints is corresponded to one of the reference GPS parameters respectively in the fingerprint positioning database.

6. A production method for location-aware environment, adapted for making a selected area have the location-aware function, comprising;
operating an exploration mode through a plurality of gateways, wherein the exploration mode is defined that the plurality of gateways collects the GPS parameters corresponded to a plurality of specific positions of an end device respectively, the plurality of gateways also sense RSSI corresponded to the plurality of specific positions of the end device respectively;
building a fingerprint positioning database according to the GPS parameters corresponded to the specific positions of the end device and the RSSI corresponded to the specific positions of the end device respectively;
operating at a test mode when a collection level of the fingerprint positioning database is achieved to a preset condition;
making each of the gateways sense a test RSSI corresponded to a test position of the end device in the test mode;
obtaining a corresponded reference GPS parameter through finding corresponding data of the fingerprint positioning database according to the test RSSI;
comparing the reference GPS parameter with a real GPS parameter corresponded to the test position of the end device; and
determining the selected area is a location-aware completed area when a difference between the reference GPS parameter and the real GPS parameter is smaller than or equal to a preset error.

7. The production method for location-aware environment of claim 6, further comprising:
determining that the selected area is needed to add an amount of the gateways, ending the test mode, and operating the exploration mode again if the difference between the reference GPS parameter and the real GPS parameter is greater than the preset error; and
making the plurality of gateways collect the GPS parameters corresponded to a plurality of other specific positions of the end device respectively, the plurality of gateways also sense RSSI corresponded to the other specific positions of the end device respectively in order to accumulate data amount of the fingerprint positioning database.

8. The production system for location-aware environment of claim 7, further comprising:
operating the exploration mode through the plurality of gateways after adding the amount of gateways, the host operates the test mode again after the collection level of the fingerprint positioning database is achieved to the preset condition; and determining that the selected area is the location-aware completed area if the difference between the reference GPS parameter and the real GPS parameter is smaller than or equal to a preset error in the test mode, after determining the selected area is the location-aware completed area, not operating the exploration mode repeatedly.

9. The production method for location-aware environment of claim 6, wherein the steps of collecting the GPS parameters corresponded to a plurality of specific positions of the end device respectively and sensing RSSI corresponded to the plurality of specific positions of the end device respectively, comprising:

sensing a beacon transmitted by the end device respectively through RF antennae, wherein each of the gateways has one RF antenna respectively;

calculating the RSSI corresponded to the beacon respectively through each of the gateways; and capturing the RSSI calculated by the gateways and the GPS parameter corresponded to the end device's position, wherein the GPS parameter is received by the gateway and transmitted by the end device.

10. The production method for location-aware environment of claim 6, wherein the steps of building the fingerprint positioning database according to the GPS parameters corresponded to the specific positions of the end device and the RSSI corresponded to the specific positions of the end device respectively, comprising:

sorting the gateways according to value of the RSSI between the gateways and the end device at each specific position to generate a specific positioning fingerprint in order to build the fingerprint positioning database, each of the specific positioning fingerprints is corresponded to one of the reference GPS parameters respectively in the fingerprint positioning database.

* * * * *